US010688888B2

(12) United States Patent
Wojatzki et al.

(10) Patent No.: US 10,688,888 B2
(45) Date of Patent: Jun. 23, 2020

(54) TRACK ADJUSTER

(71) Applicant: Lear Corporation, Southfield, MI (US)

(72) Inventors: Michael Wojatzki, Ennigerloh (DE);
Klaus Walter, Paderborn (DE);
Bernhard Bexten, Rietberg (DE);
Marc Laumeier, Langenberg-Benteler (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/933,656

(22) Filed: Mar. 23, 2018

(65) Prior Publication Data

US 2018/0272898 A1 Sep. 27, 2018

(30) Foreign Application Priority Data

Mar. 23, 2017 (DE) .......................... 10 2017 204 884
Sep. 14, 2017 (EP) ....................................... 17191062

(51) Int. Cl.
*B60N 2/08* (2006.01)
*B60N 2/06* (2006.01)
*B60N 2/90* (2018.01)
*B60N 2/07* (2006.01)

(52) U.S. Cl.
CPC ............... *B60N 2/085* (2013.01); *B60N 2/06* (2013.01); *B60N 2/0806* (2013.01); *B60N 2/0825* (2013.01); *B60N 2/0881* (2013.01); *B60N 2/0887* (2013.01); *B60N 2/929* (2018.02); *B60N 2/0705* (2013.01); *B60N 2/08* (2013.01); *B60N 2/0837* (2013.01); *B60N 2002/952* (2018.02)

(58) Field of Classification Search
USPC ......... 248/424, 429; 296/65.01, 65.11, 65.13
See application file for complete search history.

(56) References Cited

U.S. PATENT DOCUMENTS

| 6,126,133 | A | 10/2000 | Timon et al. |
| 6,869,057 | B2 | 3/2005 | Matsumoto et al. |
| 7,293,752 | B2 | 11/2007 | McCulloch et al. |
| 7,905,461 | B2 | 3/2011 | Noffz |
| 7,918,507 | B2 | 4/2011 | Schmale |
| 7,931,246 | B2 | 4/2011 | Brewer et al. |
| 8,215,602 | B2 | 7/2012 | Walter et al. |

(Continued)

FOREIGN PATENT DOCUMENTS

| CN | 201272262 Y | 7/2009 |
| CN | 201320978 Y | 10/2009 |

(Continued)

OTHER PUBLICATIONS

European Search Report dated Mar. 9, 2018 related to corresponding European Application No. 1719 1062.3.

*Primary Examiner* — Alfred J Wujciak
(74) *Attorney, Agent, or Firm* — Fishman Stewart PLLC

(57) ABSTRACT

A track adjuster includes a pair of tracks, a lockset configured to selectively restrict movement of the pair of tracks, a first lever configured to actuate an actuator of the lockset, a second lever configured to actuate the first lever, and a spring configured to apply a first biasing force to the first lever in a first rotational direction and apply a second biasing force to the first lever in a second rotational direction. The spring may be a torsion spring that may be wrapped at least partially around a cross member connecting the pair of tracks with a second pair of tracks.

20 Claims, 7 Drawing Sheets

(56) References Cited

U.S. PATENT DOCUMENTS

| | | | |
|---|---|---|---|
| 8,550,420 B2 | 10/2013 | Wojatzki et al. | |
| 8,573,698 B2 | 11/2013 | Wojatzki et al. | |
| 9,114,735 B2 | 8/2015 | Utzinger | |
| 9,120,400 B2 | 9/2015 | Ruthmann et al. | |
| 9,371,013 B2 * | 6/2016 | Nakamura | B60N 2/0705 |
| 9,393,883 B2 | 7/2016 | Wojatzki et al. | |
| 2008/0048476 A1 | 2/2008 | Kojima et al. | |
| 2009/0218843 A1 | 9/2009 | Wojatzki et al. | |
| 2011/0024595 A1 | 2/2011 | Oi et al. | |
| 2012/0074287 A1 | 3/2012 | Wojatzki et al. | |
| 2013/0206952 A1 * | 8/2013 | Yamada | B60N 2/0722 248/429 |
| 2013/0319167 A1 * | 12/2013 | Harvey | B60N 2/0818 74/523 |
| 2014/0145054 A1 * | 5/2014 | Yamada | B60N 2/0705 248/429 |

FOREIGN PATENT DOCUMENTS

| | | |
|---|---|---|
| DE | 102006047525 A1 | 5/2007 |
| DE | 112009003598 T5 | 8/2012 |
| DE | 112009003579 T5 | 9/2012 |
| DE | 102011088878 A1 | 6/2013 |
| DE | 102015220262 A1 | 2/2017 |
| EP | 0117131 A2 | 8/1984 |

* cited by examiner

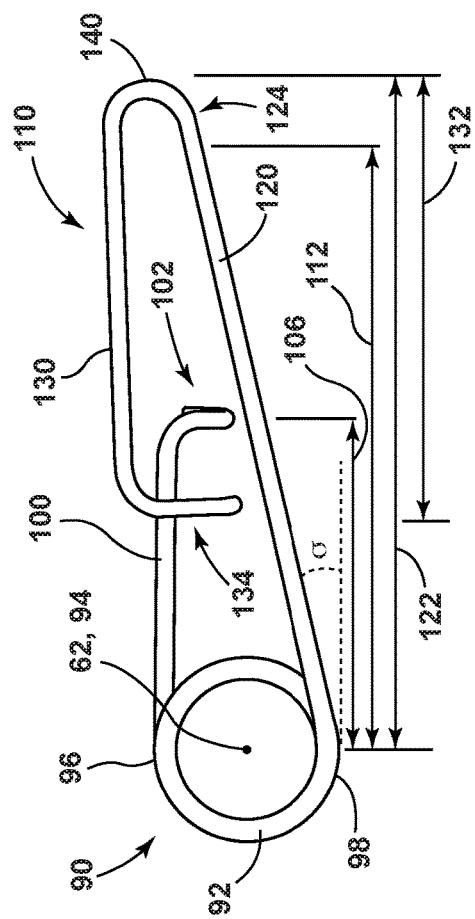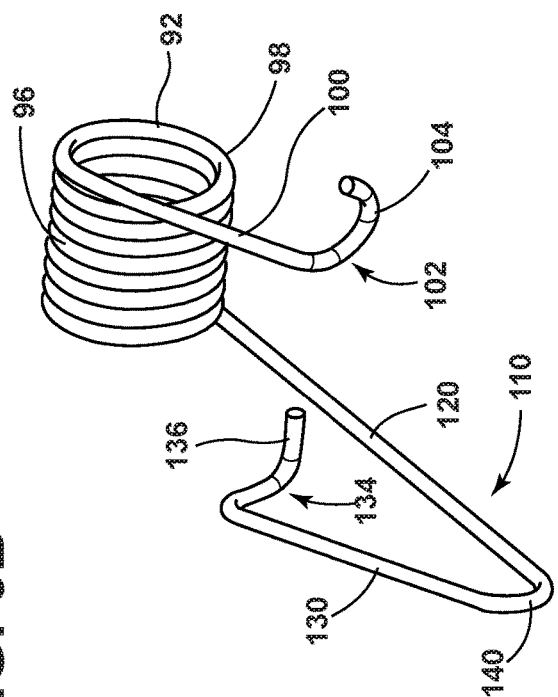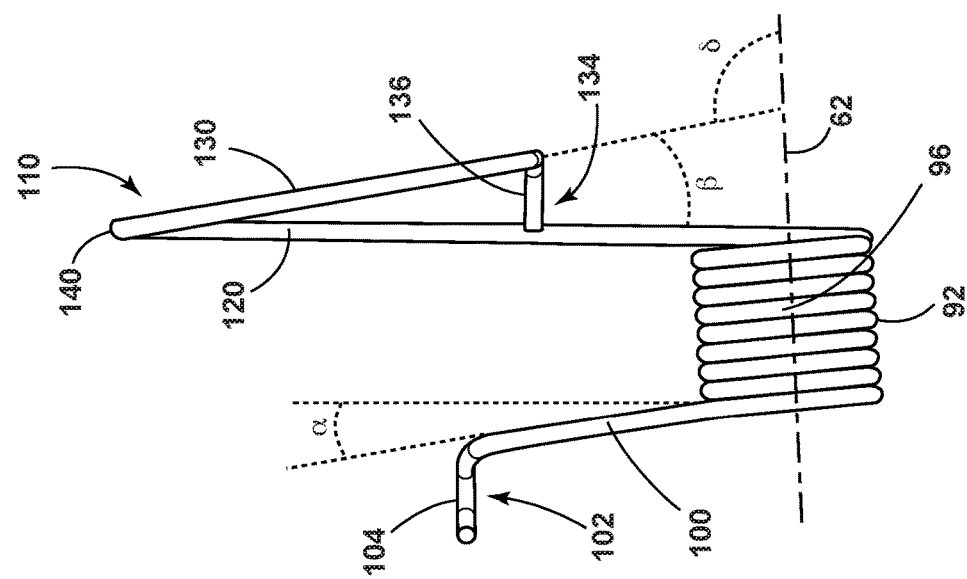

TRACK ADJUSTER

CROSS REFERENCE TO RELATED APPLICATIONS

This application claims the benefit of European Patent Application No. 17191062.3 filed Sep. 14, 2017 and German Patent Application No. 102017204884.0 filed Mar. 23, 2017, the disclosures of which are hereby incorporated herein by reference in their entireties.

TECHNICAL FIELD

The present disclosure generally relates to track adjusters that may be used, for example, in connection with vehicle seats.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Track adjuster assemblies can be used in a number of applications, such as vehicles. Track adjuster assemblies may include pairs of tracks and locksets for selectively locking the tracks relative to each other. Some track adjuster assemblies may be complicated and expensive to assembly and/or may include a large number of components.

There is a desire for solutions/options that minimize or eliminate one or more shortcomings of track adjuster assemblies. The foregoing discussion is intended only to illustrate examples of the present field and should not be taken as a disavowal of scope.

SUMMARY

In embodiments, a track adjuster may include a pair of tracks, a lockset configured to selectively restrict movement of the pair of tracks, a first lever configured to actuate an actuator of the lockset, a second lever configured to actuate the first lever, and/or a spring configured to apply a first biasing force to the first lever in a first rotational direction and apply a second biasing force to the first lever in a second rotational direction. The spring may be a torsion spring that may be wrapped at least partially around a cross member connecting the pair of tracks with a second pair of tracks.

With embodiments, a spring may include a first leg connected to the lockset and a second leg connected to the first lever. The first leg may provide a first biasing force, the second leg may provide a second biasing force, a length of the first leg may be shorter than a length of the second leg, the first biasing force may be greater than the second biasing force, and/or a torque provided by the first leg and a torque provided by the second leg may be balanced in a rest position of the second lever. The spring may include a first leg and a second leg, and the second leg may include a first section and a second section. The spring may include a curved connection section connecting the first section with the second section. The first section may extend radially outward and the second section may extend radially inward from the curved connection section. An end of the second section may be connected to the first lever. A length of the first section may be greater than a length of the second section.

In embodiments, a first lever may be configured to rotate about a rotation axis. The first lever may include an actuation portion that may be disposed at a distance from the rotation axis and a length of the first leg may be less than the distance. A spring may be disposed at a first side of the first lever. A leg of the spring may extend from the first side of the first lever to a second side of the first lever. The leg of the spring may engage the first lever from the second side. The spring may bias the actuator of the lockset and an actuation portion of the first lever into contact with each other. The spring may include a first leg and a second leg. The second leg may include a first section and a second section. The first section may be in contact with an actuation portion of the first lever, and the second section may extend at least partially into an aperture of the first lever. The spring may be configured to apply a first biasing force and a second biasing force to the second lever via the first lever. The first lever may extend rearward and the second lever may extend forward.

With embodiments, a cross member may be rotatably connected to a movable track of the pair of tracks. A first lever and a second lever may be fixed to the cross member such that rotation of the second lever causes rotation of the cross member and rotation of the second lever causes rotation of the cross member.

Various aspects of the present disclosure will become apparent to those skilled in the art from the following detailed description of the various embodiments, when read in light of the accompanying drawings.

BRIEF DESCRIPTION OF THE DRAWINGS

FIGS. 6A and 6B are side views generally illustrating embodiments of track adjuster springs in accordance with teachings of the present disclosure.

FIG. 6C is a perspective view an embodiment of a track adjuster spring in accordance with teachings of the present disclosure.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure.

Figure 1:
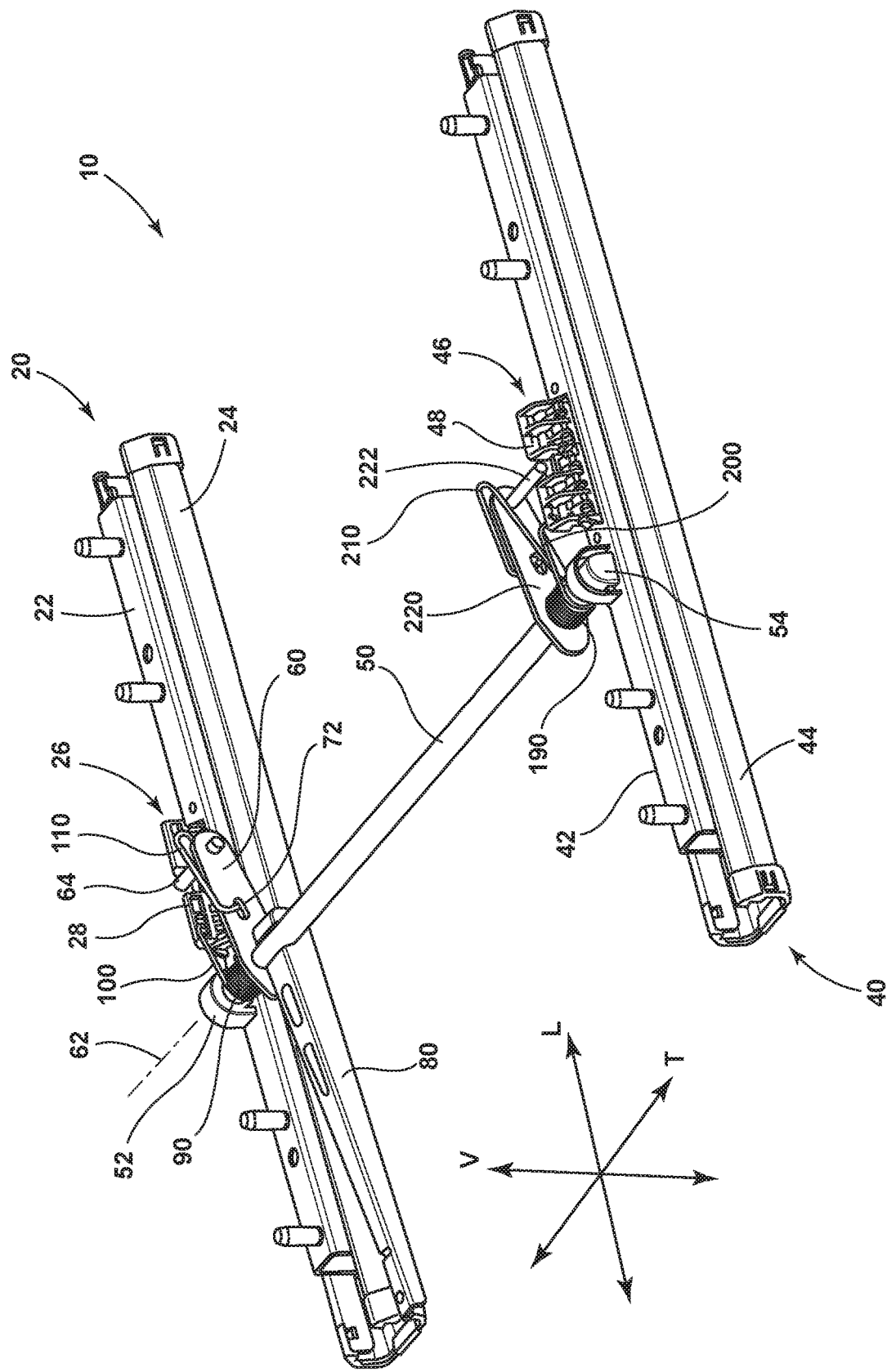
FIG. 1 is a perspective view generally illustrating portions of an embodiment of a track adjuster in accordance with teachings of the present disclosure.
Figure 2:
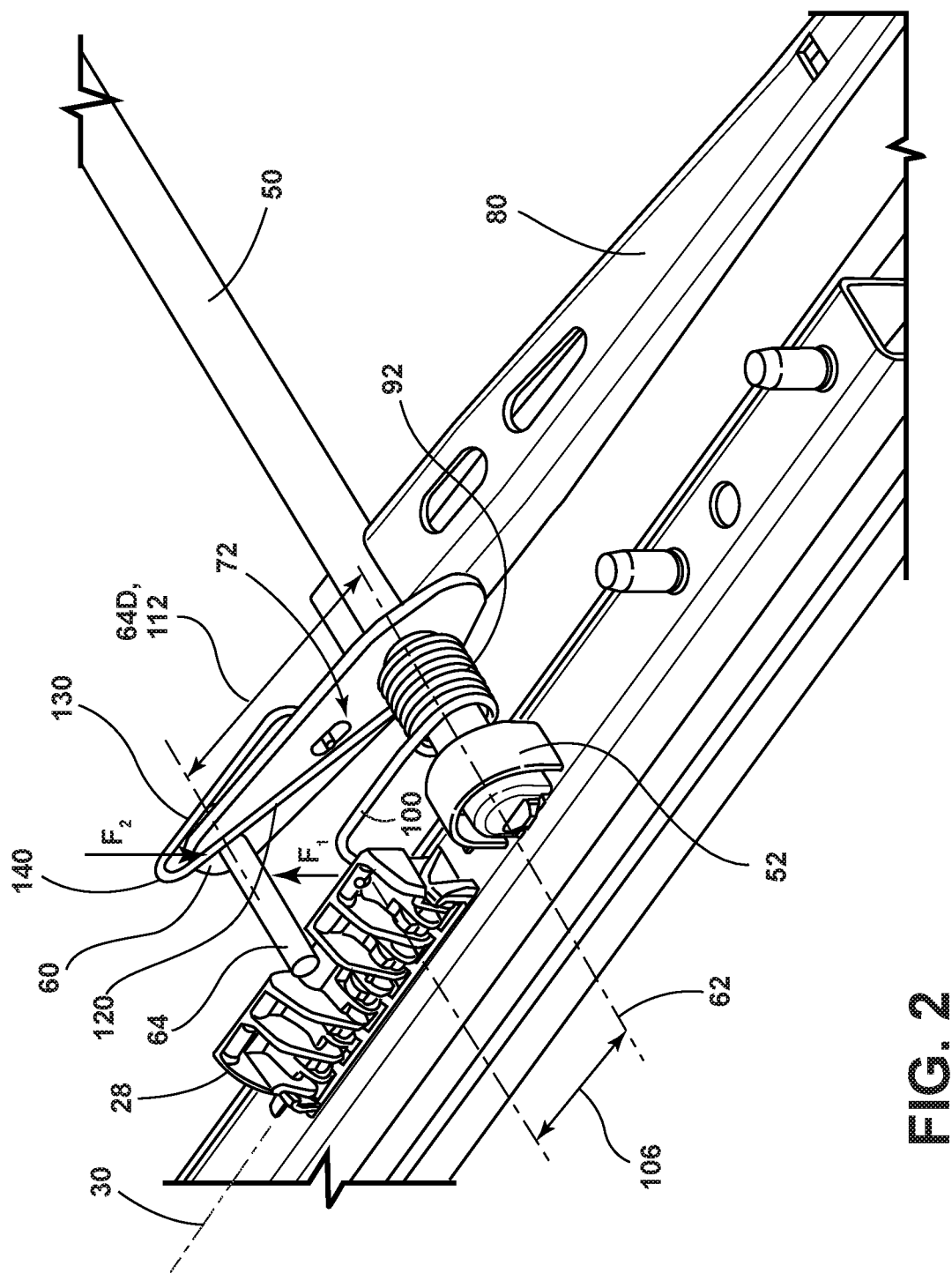
FIG. 2 is a perspective view generally illustrating portions of an embodiment of a track adjuster in accordance with teachings of the present disclosure.
Figure 3:
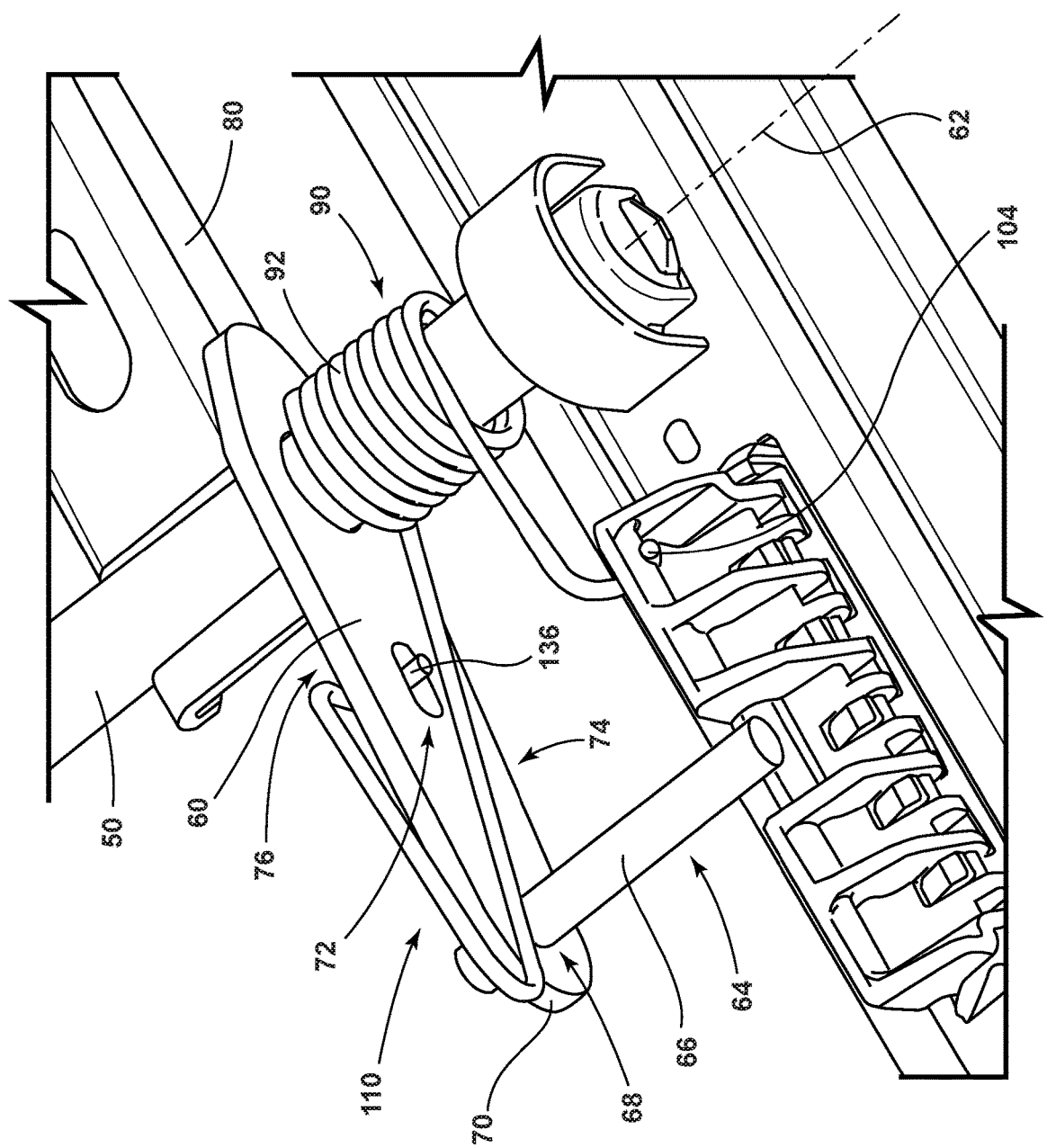
FIG. 3 is a perspective view generally illustrating portions of an embodiment of a track adjuster in accordance with teachings of the present disclosure.
Figure 4:
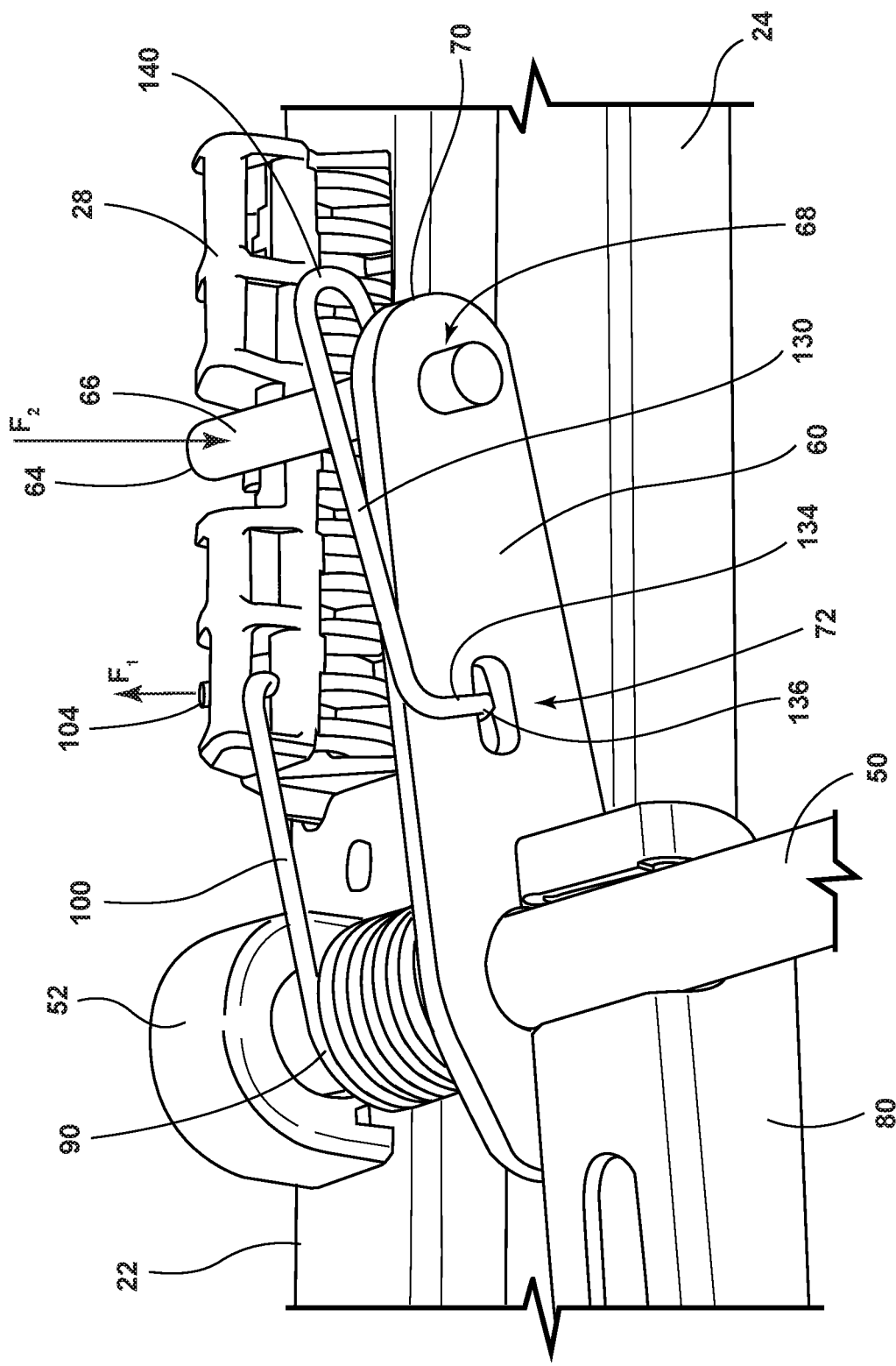
FIG. 4 is a perspective view generally illustrating portions of an embodiment of a track adjuster in accordance with teachings of the present disclosure.
Figure 5:
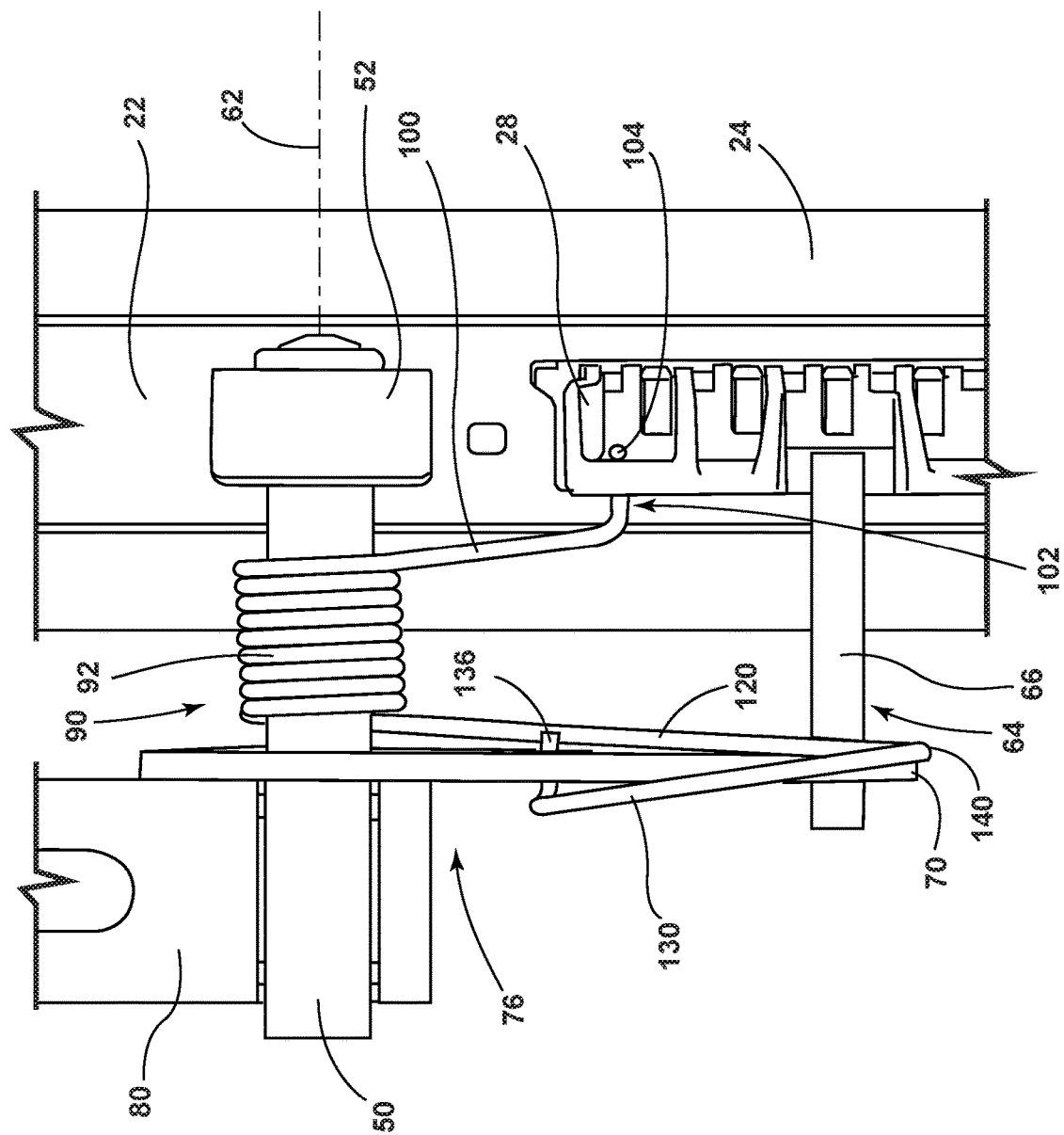
FIG. 5 is a top view generally illustrating portions of an embodiment of a track adjuster in accordance with teachings of the present disclosure.

In embodiments, such as generally illustrated in FIG. 1, a track assembly or track adjuster 10 may include a first pair of tracks 20, a first lockset 26 associated with first pair of tracks 20, a second pair of tracks 40, a second lockset 46 associated with second pair of tracks 40, and/or a cross member 50. First lockset 26 may be configured to selectively lock a first track 22 of first pair of tracks 20 relative to a second track 24 of first pair of tracks 20. Second lockset 46 may be configured to selectively lock a first track 42 of second pair of tracks 40 relative to a second track 44 of second pair of tracks 40. With embodiments, first tracks 22, 42 may be configured to move/slide relative to second tracks 24, 44 (e.g., first tracks 22, 42 may be movable tracks and second tracks 24, 44 may be fixed tracks). Cross member 50 may be connected to first pair of tracks 20 via a bearing 52 that may be connected to first track 22. Cross member 50 may be connected to second pair of tracks 40 via a bearing 54 that may be connected to first track 42.

With embodiments, such as generally illustrated in FIGS. 1, 2, 3, 4, and 5, a track adjuster 10 may include a first lever 60 that may be configured to actuate an actuator 28 of lockset 26. Actuator 28 may, for example, be configured to rotate about an axis 30 parallel to a longitudinal direction L. First lever 60 may include one or more of a variety of shapes, sizes, configurations, and/or materials. First lever 60 may be configured to rotate about a rotation axis 62 that may be generally perpendicular to a longitudinal direction L and/or parallel to a transverse direction T. First lever 60 may rotate between a first/rest position in which first lever 60 does not actuate actuator 28 of lockset 26 and a second position in which first lever 60 actuates actuator 28. Actuation of actuator 28 via first lever 60 may unlock lockset 26, which may permit at least one of first track 22 and second track 24 to move (e.g., longitudinally) relative to the other.

In embodiments, first lever 60 may include a generally planar configuration and/or may be disposed generally parallel to plane defined by a longitudinal direction L and a vertical direction V. First lever 60 may be connected to rotate with cross member 50. For example and without limitation, first lever 60 may be welded to cross member 50. First lever 60 may extend generally in a longitudinal direction L (e.g., may extend generally rearward).

With embodiments, first lever 60 may include an actuation portion 64 that be configured to contact actuator 28. Actuation portion 64 may include one or more of a variety of shapes, sizes, configurations, and/or materials. For example and without limitation, actuation portion 64 may include a protrusion or peg that may extend perpendicularly from first lever 60 and/or may extend in a substantially transverse direction T. Actuation portion 64 may extend from and/or through an aperture 68 in first lever 60. Actuation portion 64 may be disposed at a distance 64D, from rotation axis 62 and/or may be disposed at or about an end 70 of first lever 60.

In embodiments, a second lever 80 may be connected to cross member 50 such that second lever 80 may rotate with cross member 50. For example and without limitation, second lever 80 may be welded to cross member 50. With embodiments, second lever 80 may include and/or be configured as a handle for actuation by a user (e.g., a vehicle occupant). Second lever 80 may extend generally in a longitudinal direction L (e.g., may extend generally forward).

With embodiments, such as generally illustrated in FIGS. 1, 2, 3, 4, 5, 6A, 6B, and 6C, track adjuster 10 may include a spring 90 that may be configured to maintain second lever 80 in a rest position. Spring 90 may include one or more of a variety of shapes, sizes, configurations, and/or materials. Spring 90 may include a body 92, a first leg 100, and/or a second leg 110. In embodiments, a spring 90 may be configured as a torsion spring and body 92 may include, for example, one or more windings. A center 94 of body 92 may be aligned with rotation axis 62 and/or body 92 may be at least partially wrapped around cross member 50. Body 92 may be disposed (e.g., wound around cross member 50) between first pair of tracks 20 and first lever 60.

With embodiments, first leg 100 may extend from body 92 in a longitudinal direction L and/or a transverse direction T. For example and without limitation, first leg 100 may extend at an oblique angle α above/relative to a longitudinal direction L. First leg 100 may extend from a top 96 of body (e.g., over cross member 50). An end 102 of first leg 100 may include a protrusion 104 that may engage lockset 26 and/or actuator 28 of lockset 26. Protrusion 104 may, for example, extend in a direction generally parallel with a transverse direction T and/or with rotation axis 62. Protrusion 104 may include a hook-shaped configuration that may open upward to engage actuator 28 of lockset 26.

In embodiments, spring 90 may include a second leg 110 that may be connected to first lever 60. Second leg 110 may include a first section 120 and/or a second section 130. First section 120 may extend from body 92 in a first direction (e.g., a generally rearward direction). Second section 130 may extend from an end 124 of first section 120 and may extend in a second direction (e.g., a generally forward direction). A connection section 140 may connect first section 120 with second section 130 and may be curved.

With embodiments, a first section 120 may extend generally toward actuation portion 64 and/or may extend beyond actuation portion 64 (e.g., in a generally rearward direction). First section 120 may extend, at least partially, in a longitudinal direction L, a vertical direction V, and/or a transverse direction T. For example and without limitation, first section 120 may extend at an oblique angle σ relative to a longitudinal direction. First section 120 may contact actuation portion 64. For example and without limitation, first section 120 may extend from a bottom 98 of body 92 and above actuation portion 64 such that first section 120 may contact a top 66 of actuation portion 64. First section 120 may apply a biasing force $F_2$ to first lever via actuation portion 64. The biasing force $F_2$ may, for example, be directed in a generally vertical direction (e.g., downward). In embodiments, first section 120 may extend beyond an end 70 of first lever 60 and/or connection section 140 may be disposed at least partially beyond end 70 of first lever 60.

In embodiments, second section 130 may extend from an end 124 of first section 120, which may be disposed beyond (e.g., rearward of) actuation portion 64 and/or end 70 of first lever 60. Second section 130 may extend from a curved connection section 140 at an oblique angle β relative to first section 120 and/or an oblique angle δ relative to rotation axis 62 (e.g., second section 130 may extend forward in a longitudinal direction L and inward toward second pair of tracks 40 in a transverse direction T). A length 132 of second section 130 may be less than a length 122 of first section 120. For example and without limitation, second section 130 may be at least about 10%, 15%, 20%, 25%, or a greater percent shorter than first section 120. An end 134 of second section 130 may include a protrusion 136 that may be configured to engage first lever 60. For example and without limitation, first lever 60 may include an aperture, recess, or slot 72 that protrusion 136 may extend into and/or through (e.g., to limit access to an end of protrusion 136, which may be sharp). Protrusion 136 may extend in a direction generally parallel to rotation axis 62 and/or a transverse direction T. In embodiments, second section 130 may extend vertically above (e.g., may be vertically offset from) first section 120. For example and without limitation, connection section 140 may extend generally upward (e.g., vertically) from first section 120.

With embodiments, first section 120 may extend on a first side 74 of first lever 60 (e.g., a first lateral side). Second section 130 may extend at least partially on a second side 76 of first lever 60. For example and without limitation, protrusion 136 may extend into slot 72 from second side 76 of first lever 60 and/or through to first side 74.

In embodiments, spring 90 may be configured to maintain second lever 80 in a rest position and/or bias second lever 80 toward a rest position (e.g., the positions shown in FIGS. 1-5). Maintaining second lever 80 in a rest position may include applying a second biasing force $F_2$ to second lever 80 in a first rotational direction. For example and without limitation, second leg 110 may apply a second biasing force $F_2$ generally downward (e.g., clockwise in FIG. 4) to first lever 60, which may bias cross member 50 and/or second lever 80 toward rotation in a clockwise direction. Second biasing force $F_2$ may be applied to first lever 60 via actuation portion 64. Second biasing force $F_2$ may bias actuation portion 64 toward contact with and/or into contact with actuator 28, which may include applying a downward/unlocking force to actuator 28. In embodiments, first leg 100 may apply an opposite, first biasing force $F_1$ to actuator 28 (e.g., an upward/locking force). The first biasing force $F_1$ and second biasing force $F_2$ may be configured such that, at rest/an equilibrium state, second lever 80 may be maintained in a generally horizontal position. For example and without limitation, the first biasing force $F_1$ and second biasing force $F_2$ may be balanced, which may not include biasing forces $F_1$, $F_2$ being equal. If a downward force (e.g., a "misuse" force) is applied to second lever, spring 90 may bias second lever 80 back to and/or toward a generally horizontal/rest position.

With embodiments, at least in a rest position, spring 90 may at least partially support actuator 28 (e.g., bias actuator 28 toward/into a fully locked rotational position) and/or bias actuation portion 64 and actuator 28 into contact with each other. Supporting actuator 28 and/or biasing actuation portion 64 and actuator 28 into contact with each other may reduce or eliminate rattling noises that may be caused by movement of actuator 28 and/or intermittent contact between actuation portion 64 and actuator 28. First biasing force $F_1$ may, at least indirectly, be applied to second lever 80 (e.g., via actuator 28, actuation portion 64, first lever 60, and/or cross member 50). For example and without limitation, first leg 100 may apply first biasing force $F_1$ to second lever 80 in a first rotational direction (e.g., a locking direction) and second leg 110 may apply second biasing force $F_2$ to second lever 80 in a second, opposite rotational direction (e.g., an unlocking direction). In some instances, spring 90 may simultaneously apply first biasing force $F_1$ and second biasing force $F_2$, at least indirectly, to second lever 80.

In embodiments, a length 106 of first leg 100 may be shorter than a length 112 of second leg 110. Length 106 of first leg 100 may be measured from rotation axis 62 to protrusion 104 and an effective length 112 of second leg 110 may be measured from rotation axis 62 to an area or point at which first section 120 of second leg 110 contacts actuation portion 64 of first lever 60 (e.g., an effective length 112 of second leg 110 may not include connection section 140 and/or second section 130). For example and without limitation, length 106 of first leg 100 may be about half of length 112 of second leg 110. A magnitude of a biasing force provided by a leg (e.g., legs 100, 110) of spring 90 may correspond to a length of the respective leg. For example and without limitation, length 106 of first leg 100 may be shorter than length 112 of second leg 110 and first biasing force $F_1$ may be proportionally greater than second biasing force $F_2$ (e.g., relative to the difference in leg length). In embodiments, torque provided by first leg 100 and second leg 110 may be substantially equal and opposite. For example and without limitation, a product of length 106 of first leg 100 and a magnitude of first biasing force $F_1$ may equal a product of length 112 of second leg 110 and a magnitude of second biasing force $F_2$, at least at a rest position of second lever 80.

With embodiments, such as generally illustrated in FIG. 1, a second spring 190 may be associated with a second pair of tracks 40, may be connected to a third lever 220, and/or may be connected to a second lockset 46. Second spring 190 may include the same or a similar configuration as spring 90 and/or may include a mirrored configuration of spring 90. Second spring 190 may, for example, may include a first leg 200 connected to second lockset 46 and a second leg 210 connected with third lever 220 (e.g., via an actuation portion 222 of third lever 220). First spring 90 and second spring 190 may work in conjunction to maintain second lever 80 in a rest position and/or prevent rattling (e.g., of first lockset 26, of second lockset 46, between actuator 28 and first lever 60, and/or between an actuator 48 of second lockset 46 and third lever 220). Third lever 220 may be connected (e.g., welded) to cross member 50, may rotate with cross member 50, and/or may be disposed generally in parallel with first lever 60.

With embodiments a track adjuster 10 may include three subassemblies, such as a first track subassembly (e.g., first pair of tracks 20 and first lockset 26), a second track subassembly (e.g., second pair of tracks 40 and second lockset 46), and/or a cross member subassembly (e.g., cross member 50; levers 60, 220; springs 90, 190; lever/handle 80). Assembling a track adjuster 10 from the three subassemblies may include connecting the cross member subassembly to the first and second track subassembly. Connecting the cross member subassembly with the first and second track subassembly may be a fairly simple process. For example and without limitation, connecting the cross member subassembly with the first and second track subassembly may include connecting cross member 50 with bearings 52, 54 and connecting first legs 100, 200 of springs 90, 190 with locksets 26, 46. While assembly of a track adjuster 10 may include additional steps, assembly may, at least with some embodiments, be limited to just these four connections (e.g. two connections between cross member 50 and bearings 52, 54 and two connections between springs 90, 190 and locksets 26, 46), which may simplify assembly relative to other designs.

Figure 7:
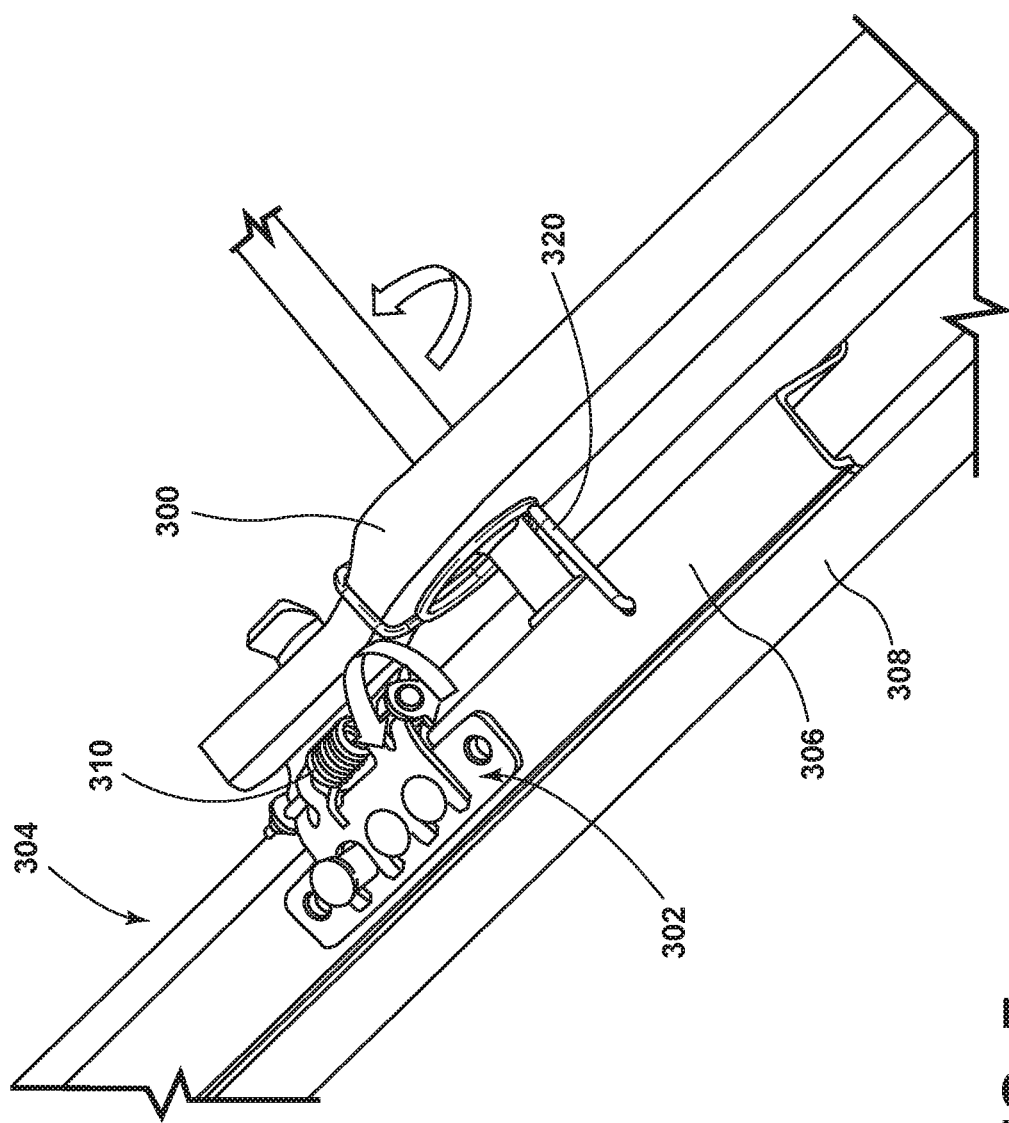
FIG. 7 is a perspective view generally illustrating portions of a track adjuster.

In some designs, such as generally illustrated in FIG. 7, a lever 300 may be configured to actuate a lockset 302 associated with a pair of tracks 304. A first spring 310 may be configured to reduce rattling of the lockset 302 and a completely separate/independent second spring 320 may be configured to bias lever 300 toward a rest position (e.g., may apply a generally upward force to maintain lever 300 in a generally horizontal position). Including two springs 310, 320 may involve a more complicated assembly process and/or greater costs than designs with a single spring that may provide rattle prevention functionality and misuse protection. In some designs, another pair of springs may be associated with an opposite pair of tracks, which may result in a total of four springs utilized for rattle prevention functionality and misuse protection.

Additionally or alternatively, in designs with two springs (per pair of tracks), the two springs 310, 320 may effectively be acting against each other. For example, second spring 320 may bias lever 300 in an actuation direction and if the force provided by second spring 320 becomes greater than the force provided by first spring 310, second spring 320 may cause rotation of lever 300. Rotation of lever 300 may actuate/unlock lockset 302 and allow a movable track 306 of pair of tracks 304 to move relative to a fixed track 308 of pair of tracks 304 (e.g., may cause an unintended unlocking or self-unlocking).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A track adjuster for vehicle seats, the track adjuster comprising:
   a pair of tracks configured to be mounted in a vehicle;
   a lockset configured to selectively restrict movement of the pair of tracks;
   a first lever configured to actuate an actuator of the lockset;
   a second lever configured to actuate the first lever; and
   a spring configured to apply a first biasing force to the first lever in a first rotational direction and apply a second biasing force to the first lever in a second rotational direction;
   wherein the spring is a torsion spring wrapped at least partially around a cross member connecting the pair of tracks with a second pair of tracks.

2. The track adjuster of claim 1, wherein the spring includes a first leg connected to the lockset and a second leg connected to the first lever.

3. The track adjuster according to claim 2, wherein the first leg provides the first biasing force, the second leg provides the second biasing force, a length of the first leg is shorter than a length of the second leg, the first biasing force is greater than the second biasing force, and a torque provided by the first leg and a torque provided by the second leg are balanced in a rest position of the second lever.

4. The track adjuster of claim 1, wherein the spring includes a first leg and a second leg, and the second leg includes a first section and a second section.

5. The track adjuster of claim 4, wherein the spring includes a curved connection section connecting the first section with the second section, the first section extends radially outward and the second section extends radially inward from the curved connection section.

6. The track adjuster of claim 4, wherein an end of the second section is connected to the first lever.

7. The track adjuster of claim 4, wherein a length of the first section is greater than a length of the second section.

8. The track adjuster of claim 4, wherein the first lever is configured to rotate about a rotation axis; the first lever includes an actuation portion disposed at a distance from the rotation axis; and a length of the first leg is less than the distance.

9. The track adjuster of claim 1, wherein the spring is disposed at a first side of the first lever, a leg of the spring extends from the first side of the first lever to a second side of the first lever, and the leg of the spring engages the first lever from the second side.

10. The track adjuster of claim 1, wherein the spring biases the actuator of the lockset and an actuation portion of the first lever into contact with each other.

11. The track adjuster of claim 1, wherein the spring includes a first leg connected to the lockset and a second leg connected to the first lever; the first leg provides the first biasing force; the second leg provides the second biasing force; a length of the first leg is shorter than a length of the second leg; the first biasing force is greater than the second biasing force; and a torque provided by the first leg and a torque provided by the second leg are balanced in a rest position of the second lever.

12. The track adjuster of claim 1, wherein the spring includes a first leg and a second leg; the second leg includes a first section and a second section; the spring includes a curved connection section connecting the first section with the second section; the first section extends radially outward; the second section extends radially inward from the curved connection section; and a length of the first section is greater than a length of the second section.

13. The track adjuster of claim 12, wherein an end of the second section is connected to the first lever.

14. A track adjuster for vehicle seats, the track adjuster comprising:
a pair of tracks configured to be mounted in a vehicle;
a lockset configured to selectively restrict movement of the pair of tracks;
a first lever configured to actuate an actuator of the lockset;
a second lever configured to actuate the first lever; and
a spring configured to apply a first biasing force to the first lever in a first rotational direction and apply a second biasing force to the first lever in a second rotational direction;
wherein the spring includes a first leg and a second leg, the second leg includes a first section and a second section, the first section is in contact with an actuation portion of the first lever, and the second section extends at least partially into an aperture of the first lever.

15. The track adjuster of claim 14, wherein the spring is a torsion spring wrapped at least partially around a cross member connecting the pair of tracks with a second pair of tracks.

16. The track adjuster of claim 1, wherein the spring is configured to apply the first biasing force and the second biasing force to the second lever via the first lever.

17. The track adjuster of claim 1, wherein the first lever extends rearward and the second lever extends forward.

18. The track adjuster of claim 14, comprising a cross member rotatably connected to a movable track of the pair of tracks; wherein the first lever and the second lever are fixed to the cross member such that rotation of the first lever causes rotation of the cross member and rotation of the second lever causes rotation of the cross member.

19. A track adjuster for vehicle seats, the track adjuster comprising:
a lockset configured to selectively restrict movement of a pair of tracks configured to be mounted in a vehicle;
a first lever configured to actuate an actuator of the lockset;
a second lever configured to actuate the first lever;
a cross member configured for rotatable connection with the pair of tracks and a second pair of tracks; and
a spring configured to apply a first biasing force to the first lever in a first rotational direction and apply a second biasing force to the first lever in a second rotational direction
wherein the first lever and the second lever are fixed to the cross member such that rotation of the first lever causes rotation of the cross member and rotation of the second lever causes rotation of the cross member; and the spring includes a first leg connected to the lockset and a second leg connected to the first lever.

20. The track adjuster of claim 19, wherein the spring is configured to apply the first biasing force and the second biasing force to the second lever via the first lever.

* * * * *